United States Patent
Molstad et al.

(10) Patent No.: US 6,952,317 B2
(45) Date of Patent: Oct. 4, 2005

(54) AMPLITUDE-BASED SERVO PATTERNS FOR MAGNETIC MEDIA

(75) Inventors: Richard W. Molstad, St. Paul, MN (US); Yung Yip, Afton, MN (US)

(73) Assignee: Imation Corp., Oakdale, MN (US)

( * ) Notice: Subject to any disclaimer, the term of this patent is extended or adjusted under 35 U.S.C. 154(b) by 106 days.

(21) Appl. No.: 10/464,394

(22) Filed: Jun. 17, 2003

(65) Prior Publication Data

US 2004/0257689 A1 Dec. 23, 2004

(51) Int. Cl.[7] ................. G11B 5/09; G11B 5/584; G11B 5/02
(52) U.S. Cl. ................ 360/48; 360/57; 360/77.12
(58) Field of Search ................... 360/77.12, 48, 360/75, 78.02, 57, 43

(56) References Cited

U.S. PATENT DOCUMENTS

| | | | |
|---|---|---|---|
| 4,554,600 A | * 11/1985 | Sellars | 360/77.01 |
| 5,689,384 A | 11/1997 | Albrecht et al. | |
| 6,021,013 A | 2/2000 | Albrecht et al. | |
| 6,134,070 A | 10/2000 | Tran et al. | |
| 6,241,674 B1 | 6/2001 | Phillips et al. | |
| 6,271,786 B1 | 8/2001 | Huff et al. | |
| 6,312,384 B1 | 11/2001 | Chiao | |
| 6,363,107 B1 | 3/2002 | Scott | |
| 6,381,261 B1 | 4/2002 | Nagazumi | |
| 6,385,268 B1 | 5/2002 | Fleming et al. | |
| 6,400,754 B2 | 6/2002 | Fleming et al. | |
| 2001/0053174 A1 | 12/2001 | Fleming et al. | |
| 2002/0093640 A1 | 7/2002 | Watanabe et al. | |

OTHER PUBLICATIONS

"Pulse Compression Recording," Dent III et al., IEEE Transaction on Magnetics, vol. MAG–12, No. 6, Nov. 1976, pp. 743–745.

* cited by examiner

*Primary Examiner*—Andrew L. Sniezek
(74) *Attorney, Agent, or Firm*—Eric D. Levinson

(57) ABSTRACT

The invention is directed to a magnetic storage medium recorded with an amplitude-based servo pattern in which one or more first servo windows positioned above a centerline of a servo track have a different width than one or more second servo windows positioned below the centerline. The first servo windows may be larger or smaller than the second servo windows. In either case, by detecting the widths of the servo windows and detecting signal amplitude as a servo head passes relative to the servo track, servo tracking can be achieved without the use or need for additional synchronization marks in the servo pattern.

18 Claims, 8 Drawing Sheets

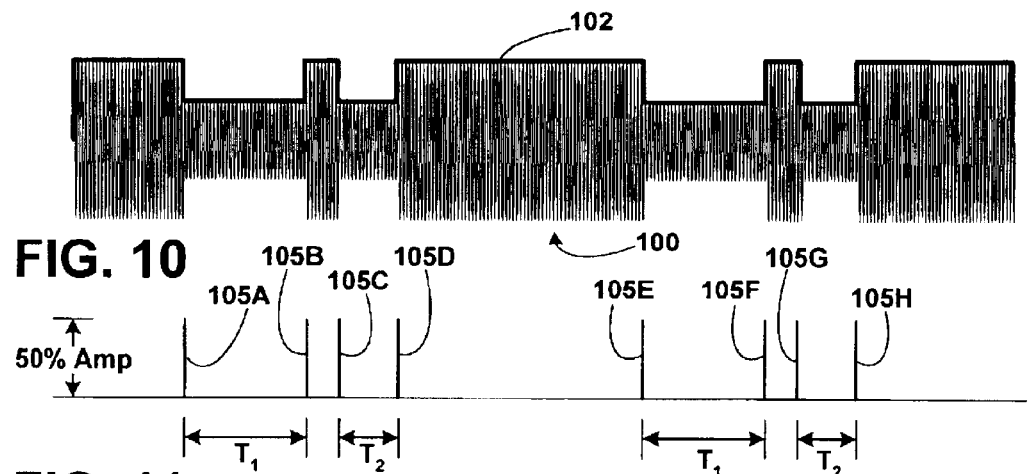
FIG. 10
FIG. 11
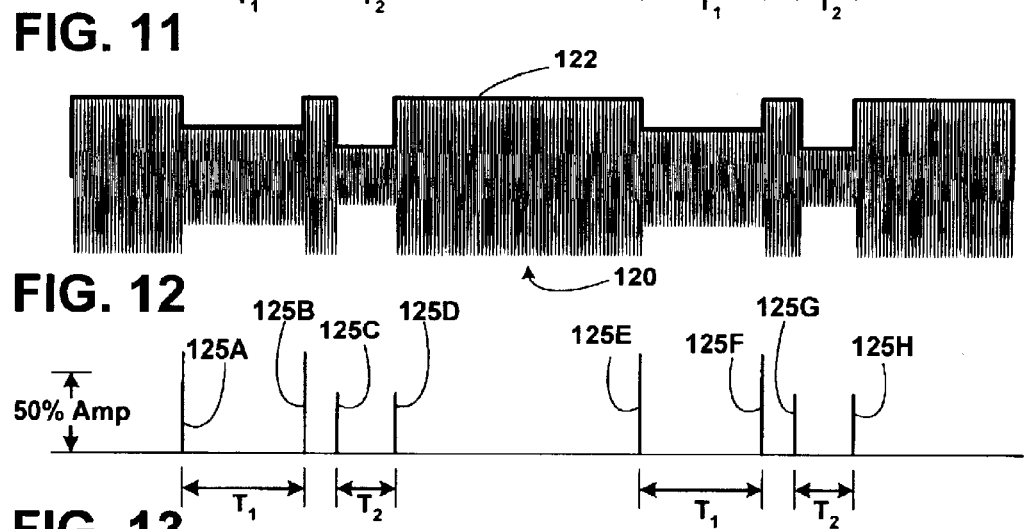
FIG. 12
FIG. 13
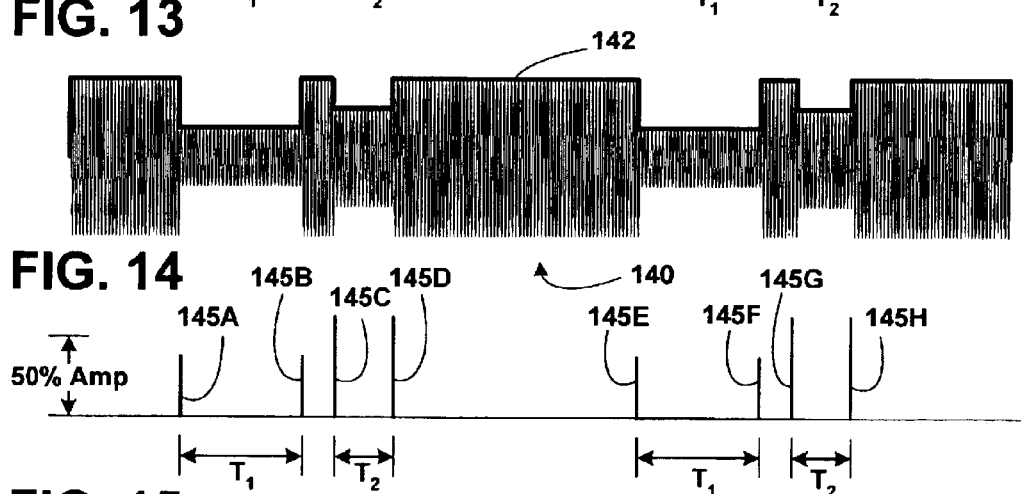
FIG. 14
FIG. 15

AMPLITUDE-BASED SERVO PATTERNS FOR MAGNETIC MEDIA

TECHNICAL FIELD

The invention relates to magnetic storage media, and, more particularly, magnetic storage media having pre-written servo patterns.

BACKGROUND

Data storage media are commonly used for storage and retrieval of data, and come in many forms, such as magnetic tape, magnetic disks, optical tape, optical disks, holographic disks or cards, and the like. Magnetic tape media remains an economical medium for storing large amounts of data. For example, magnetic tape cartridges or large spools of magnetic tape are often used to back-up data in large computing centers. Magnetic tape cartridges also find application in the backup of data stored on smaller computers such as desktop or notebook computers.

In magnetic media, data is typically stored as magnetic signals that are magnetically recorded on the medium surface. The data stored on the medium is typically organized along "data tracks," and transducer heads are positioned relative to the data tracks to write data to the tracks or read data from the tracks. A typical magnetic storage medium, such as magnetic tape, typically includes several data tracks. Optical media, holographic media and other media formats can also make use of data tracks.

Servo patterns refer to signals or other recorded markings on the medium that are used for tracking purposes. In other words, servo patterns are recorded on the medium to provide reference points relative to the data tracks. A servo controller interprets detected servo patterns and generates position error signals. The position error signals are used to adjust the lateral distance of the transducer head relative to the data tracks so that the transducer head is properly positioned along the data tracks for effective reading and/or writing of the data.

With some data storage media, such as magnetic tape, the servo patterns are stored in specialized tracks on the medium, called "servo tracks." Servo tracks serve as references for the servo controller. Servo tracks typically hold no data except for information that is useful to the servo controller to identify positioning of a transducer head relative to the surface of the medium.

The servo patterns recorded in the servo tracks may be sensed by one or more servo heads. For example, servo heads may be dedicated heads that read only servo patterns in the servo tracks. Alternatively, servo heads may be integrated with a read/write head. In any case, once a particular servo track is located by the servo head, a data track can be located on the medium according to the data track's displacement from the servo track. The servo controller receives detected servo signals from the servo heads and generates position error signals, which are used to adjust positioning of a read/write head relative to the data tracks.

Servo patterns are referred to as pre-recorded when they are recorded during the fabrication of the media. In other words, pre-recorded servo patterns are servo patterns recorded in the media prior to the media being used for storage of data. These pre-recorded servo patterns allow the media to achieve higher storage densities because the servo patterns enable positions on the media to be located with greater precision. In particular, servo patterns facilitate the ability to pinpoint locations on media surfaces with greater accuracy. Therefore, servo patterns allow for smaller amounts of media surface to be used to store units of data.

Amplitude-based servo patterns refer to servo patterns in which detection of the servo signal amplitude enables identification of head positioning relative to the medium. In other words, as the head passes relative to the medium, signal amplitudes of detected servo patterns can be used to determine whether the head is positioned correctly relative to a track on the medium. Amplitude-based servo patterns are commonly implemented in magnetic tape media, but may also be useful in other media.

SUMMARY

In general, the invention is directed to a magnetic storage medium recorded with an amplitude-based servo pattern. For example, the amplitude-based servo pattern may comprise a recorded signal that is selectively applied or erased to define servo windows. The servo windows are positioned above and below a centerline associated with a servo track for each of numerous servo frames along the track. As a head moves relative to the track, the amplitude of the detected signal changes as the head passes partially over the servo windows, allowing for head positioning to be determined relative to the centerline. In accordance with the invention, the servo windows positioned above the centerline have a different width than the servo windows positioned below the centerline. Such differing sized windows can eliminate the need for additional markings conventionally used for synchronization in the servo detection process.

In one embodiment, the invention provides a data storage medium comprising a servo track defining a centerline, a first amplitude-based servo window above the centerline, and a second amplitude-based servo window below the centerline. In accordance with the invention, a width of the first amplitude-based servo window is different from a width of the second amplitude-based servo window.

In another embodiment, the invention provides a system comprising a data storage medium including a servo track defining a centerline, a first amplitude-based servo window above the centerline, and a second amplitude-based servo window below the centerline, wherein a width of the first amplitude-based servo window is different from a width of the second amplitude-based servo window. The system also includes a head to pass relative to the medium at a location relative to the servo track and a controller to determine whether the location is above or below the centerline based on amplitudes of signals detected by the head.

In another embodiment, the invention provides a method comprising detecting amplitudes of a servo signal along a location relative to a servo track of a magnetic medium, detecting widths associated with the servo signal at common amplitudes, and generating position error signals based on the detected amplitudes and widths.

In another embodiment, the invention provides a method comprising recording a magnetic signal over a magnetic medium, and selectively erasing the magnetic signal to define erased servo windows, the erased servo windows including a first erased servo window positioned above a centerline of a servo track of the magnetic medium and a second erased servo window below the centerline, wherein a width of the first erased servo window is different from a width of the second erased servo window.

The invention may be capable of providing a number of advantages. In general, amplitude-based servo patterns can facilitate the ability to pinpoint locations on media surfaces with greater accuracy. Therefore, the described servo patterns can allow for smaller amounts of media surface to be used to store units of data and greater data storage density. In addition, servo patterns making use of differently sized servo windows above and below a centerline can simplify the pattern relative to conventional amplitude-based patterns by eliminating the need for additional markings conventionally used for synchronization in the servo detection. Instead, widths of the different sized servo windows can be measured in order to provide synchronization without the need for such additional synchronization markings, e.g., synchronization markings conventionally recorded between servo frames. Moreover, eliminating conventional synchronization markings can simplify the process of recording the amplitude-based servo patterns on the medium, possibly improving media quality and/or reducing media manufacturing costs. In addition, eliminating conventional synchronization markings can allow the servo windows to be placed closer together, resulting in higher servo position error signal sample rates.

Additional details of these and other embodiments are set forth in the accompanying drawings and the description below. Other features, objects, and advantages of the invention will be apparent from the description and drawings, and from the claims.

DESCRIPTION OF THE DRAWINGS

FIG. 10 illustrates a readout signal and a corresponding envelope signal that may be generated when servo read head passes relative to a servo track substantially along a centerline of a servo track.

FIG. 11 illustrates pulses that can be generated based on the envelope signal illustrated in FIG. 10.

FIG. 12 illustrates a readout signal and a corresponding envelope signal that may be generated when servo head passes relative to a servo track slightly below a centerline of a servo track.

FIG. 13 illustrates pulses that can be generated based on the envelope signal illustrated in FIG. 12.

FIG. 14 illustrates a readout signal and a corresponding envelope signal that may be generated when servo head passes relative to a servo track slightly above a centerline of a servo track.

FIG. 15 illustrates pulses that can be generated based on the envelope signal illustrated in FIG. 14.

DETAILED DESCRIPTION

The invention is directed to a magnetic storage medium recorded with an amplitude-based servo pattern in which one or more first servo windows positioned above a centerline of a servo track have a different width than one or more second servo windows positioned below the centerline. The first servo windows may be larger or smaller than the second servo windows. In either case, by detecting the widths of the servo windows and detecting signal amplitude as a servo head passes relative to the servo track, servo tracking can be achieved without the use or need for additional synchronization marks in the servo pattern. In other words, the differently sized servo windows allow for self-synchronization.

An amplitude-based servo pattern may comprise a recorded signal that is selectively erased in order to define erased servo windows, or alternatively may comprise servo windows selectively recorded on the medium. In either case, the servo windows are positioned above and below a centerline associated with a servo track for each of numerous servo frames along the track. As a head moves relative to the track along the centerline, the amplitude of the detected signal changes as the head passes partially over the servo windows, allowing for head positioning to be determined relative to the centerline. In accordance with the invention, the servo windows positioned above the centerline have a different width than the erased servo windows positioned below the centerline. Again, such differently sized servo windows can eliminate the need for additional markings conventionally used for synchronization in the servo detection, and can, therefore, simplify the servo pattern, as well as the recording techniques used to create the servo pattern.

Figure 1:
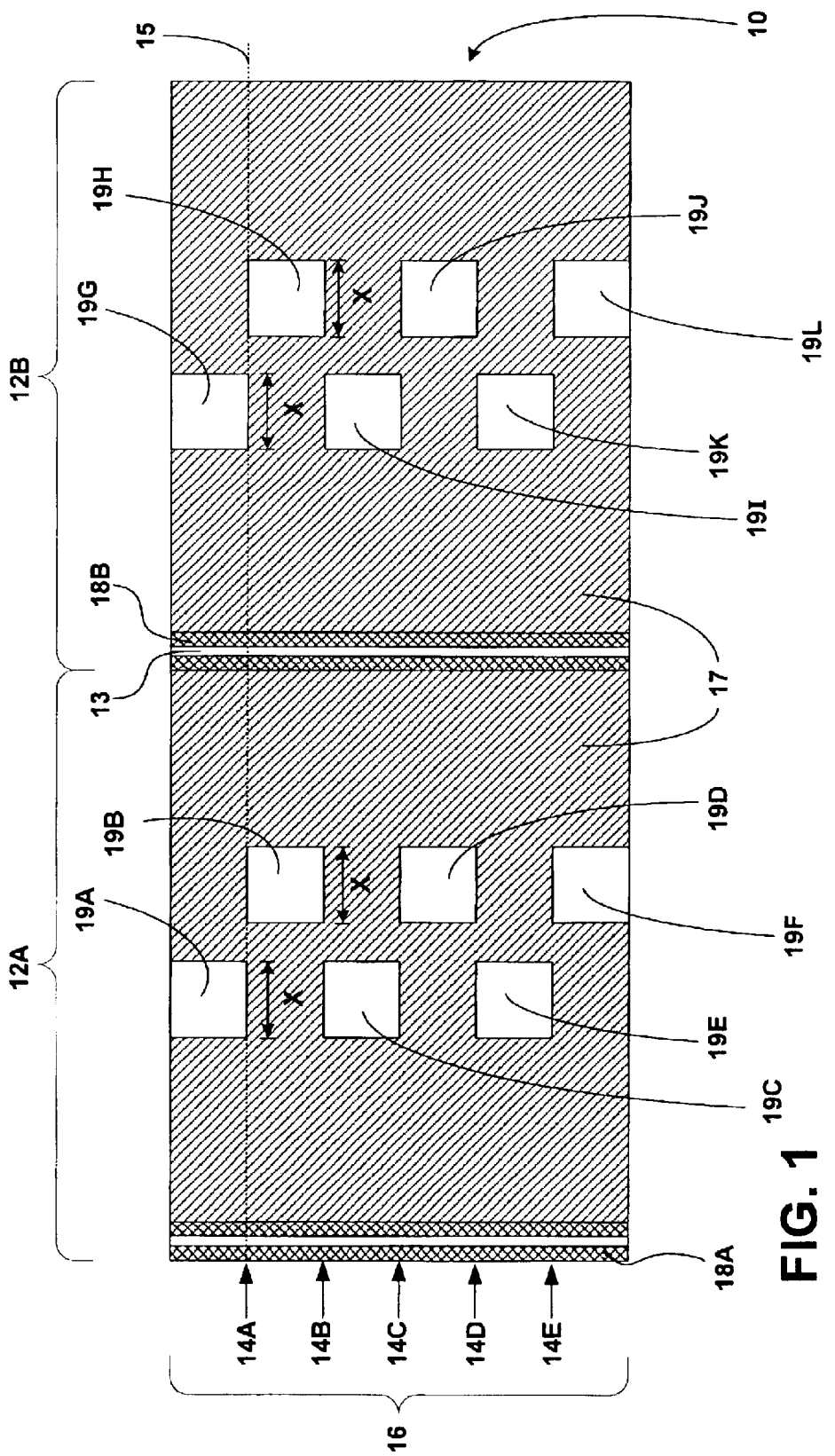
FIG. 1 is an enlarged depiction of a servo band portion of a prior art medium recorded with a conventional amplitude-based servo pattern.

FIG. 1 is an enlarged depiction of a servo band portion of a prior art medium 10 recorded with a conventional amplitude-based servo pattern. The conventional servo pattern in FIG. 1 includes two servo frames 12A and 12B. Each frame includes five servo tracks 14A, 14B, 14C, 14D and 14E. These five tracks collectively define a servo band 16. In general, a servo band is defined as a collection of servo tracks. Thus, a servo band could include any number of servo tracks. Each servo track 14 may reside a known distance from a corresponding data track (not shown).

The servo pattern can be written by passing the tape under gaps of a servo write head. A relatively wide gap in the servo head can be used to record on the surface of medium 10, a magnetic signal 17 having a first frequency. Moreover, a magnetic signal having a second frequency may define transition regions 18A and 18B between the individual frames. If desired, transition regions 18 may also include a longitudinal erase field 13 within the transition region (as labeled within transition region 18B). The transition regions 18 serve as synchronization markings in the prior art servo detection scheme.

A servo write head (or a separate erase head) having a relatively small write gap width in the direction transverse to the servo track direction can be used to create erased servo windows 19. For example, erased servo windows 19A–19L (collectively erased servo windows 19) may form a checkerboard-like configuration that enables a read head to pinpoint track locations. In accordance with the prior art, each of erased servo windows 19 have a common width (X), e.g., along an axis parallel to centerline 15. In operation, as medium 10 passes by a read head (not shown) positioned on track 1 (indicated by numeral 14A), the position of erased servo windows 19A and 19B or 19G and 19H, relative to magnetic signal 17, can accurately define the track location of track 1. Similarly, the track locations of tracks 2–5 (indicated by numerals 14B–14E respectively) can be defined by the various erased servo windows 19 relative to magnetic pattern 17. Detection of transition regions 18 provides a synchronization mechanism so that when signal amplitude indicates head positioning that is off-track, the head controller can determine whether to move the magnetic head laterally up or down in order to remedy the off-track head positioning. With common sized servo windows 19, the head controller could become out of sync if a transition region 18 or another type of synchronization mechanism is not present on prior art medium 10 between servo frames 12.

Figure 2:
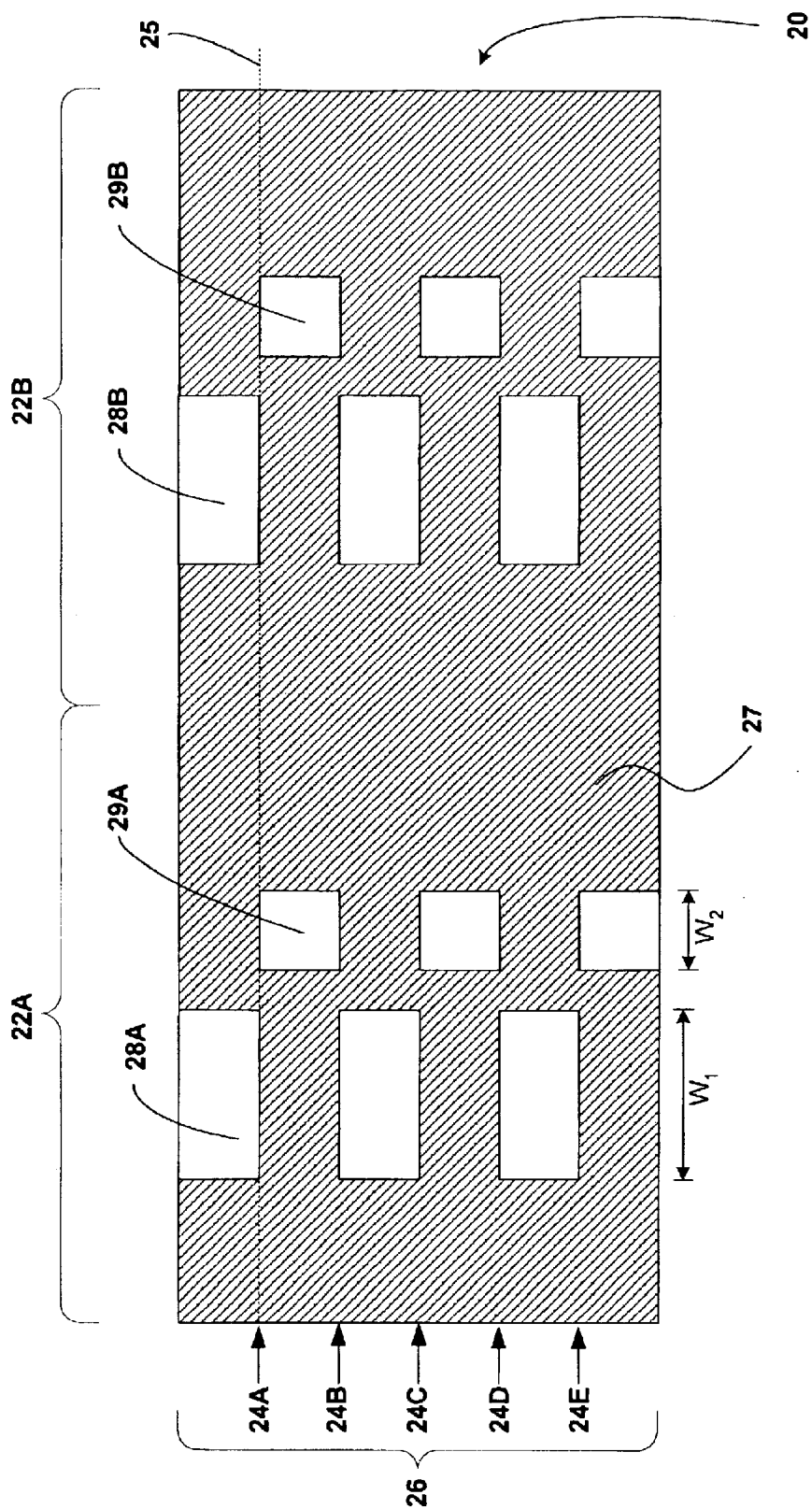
FIG. 2 is an enlarged depiction of a servo band portion of medium recorded with an amplitude-based servo pattern according to an embodiment of the invention.

FIG. 2 is an enlarged depiction of a servo band portion of medium 20 recorded with an amplitude-based servo pattern according to an embodiment of the invention. For example, medium 20 may correspond to a portion of magnetic tape, although the invention may also find application in other magnetic or non-magnetic media formats. The servo pattern in FIG. 2 includes two servo frames 22A and 22B, and each frame 22 includes five servo tracks 24A, 24B, 24C, 24D and 24E. These five tracks collectively define a servo band 26. In general, a servo band is defined as a collection of servo tracks. Thus, a servo band could include any number of servo tracks.

In practice, medium 20 may include a plurality of servo bands similar to servo band 26, and the area between the servo bands includes data tracks. For example, if band 26 includes five servo tracks 24, the area adjacent servo band 26, i.e., directly above or below servo band 26, may include five data tracks (or five sets of data tracks) which correspond to a known lateral distance from the respective servo tracks 24. Thus, by pinpointing the centerlines of tracks 24, the centers of the corresponding data tracks can likewise be determined. Sometimes, however, a number of write heads for writing data between the servo bands are utilized with a single servo read head. In that case, more than five data tracks may be defined in the area between bands that have five servo tracks. For example, if a band has five servo tracks, and three write heads are utilized for a single servo read head, fifteen data tracks may be included between the bands, and so forth.

In any event, the servo pattern in FIG. 2 is different from the prior art servo pattern in FIG. 1 in that amplitude-based servo windows 28 (hereafter servo windows 28) have different widths than amplitude-based servo windows 29 (hereafter servo windows 29). For example, servo track 24A defines a centerline 25. First servo windows 28A and 28B are positioned above centerline 25, whereas second servo windows 29A and 29B are positioned below centerline 25. Servo windows 28, 29 are typically adjacent centerline 25, albeit adjacent on opposing sides of centerline 25 such that first servo windows 28 are above centerline 25 and second servo windows 29 are below centerline 25.

Importantly, width ($W_1$) associated with first servo windows 28 is different from width ($W_2$) associated with second servo windows 29. In the illustrated example of FIG. 2, the widths $W_1$ and $W_2$ associated with servo windows 28, 29 refer to the distance spanned by the respective window along an axis parallel to centerline 25. In the illustrated example, $W_1$ is greater than $W_2$, however, in other examples, $W_2$ may be greater than $W_1$. The ratio of width $W_1$ to $W_2$ may be within the range of 4 to 1 and 1 to 4. In any case, by detecting the widths associated with the servo windows 28, 29, a magnetic drive can distinguish windows 28 from windows 29 without the need for synchronization. Accordingly, the need for transition regions 18 (FIG. 1) or other synchronization markings can be eliminated.

Servo windows 28, 29 may comprise erased servo windows, in which case region 27 comprises a recorded magnetic signal. Alternatively, servo windows 28, 29 may comprise the recorded magnetic signals, in which case, region 27 would comprise a region where no signal is present. In any event, as the medium 20 passes by a read head (not shown) positioned in proximity to track 1 (indicated by numeral 24A), the position of servo windows 28 and 29 relative to region 27 can be used to accurately define the location of centerline 25 of track 1, 24A.

The servo pattern can be written by passing the tape under gaps in a servo write head. In particular, write gaps in the servo write head (or a separate erase head) of widths that are relatively small in the direction transverse to the servo track direction can be used to write or erase servo windows 28 and 29. For example, a conventional servo erase head could be used, with a slight modification such that the erasing of servo window 28 lasts for a duration that is different from the erasing of servo window 29 as medium 20 passes by a servo erase head. Such a modification to a conventional amplitude servo writer may involve a relatively simple software change such that the erase head creates servo windows 28 and 29 of differing widths.

Similarly, the track locations of tracks 2–5 (indicated by numerals 24B–24E respectively) can be defined by the various servo windows 28, 29 relative to region 27. For each of tracks 24A, 24C and 24E, first servo windows 28 reside above a respective centerline and second servo windows 29 reside below the respective centerline. For each of tracks 24B and 24D, first servo windows 28 reside below a respective centerline and second servo windows 29 reside above the respective centerline. A pair of first and second servo windows may exist for each respective frame 22 in each respective track 24. A servo controller can be programmed to recognize, for every given servo track 24, which of the larger and smaller servo windows resides above or below the center line for that given track, e.g., based on a track identification ID, which can be recorded on medium 20 for each track.

Figure 3:
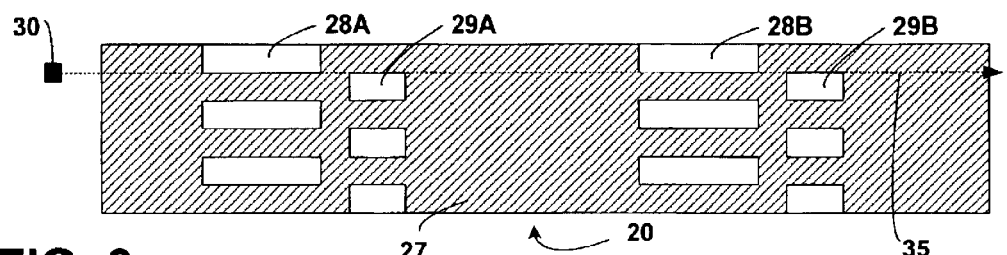
FIG. 3 is a depiction of the servo band portion of the medium illustrated in FIG. 2 with a magnetic head passing relative to the medium along a centerline of a servo track.
Figure 4:
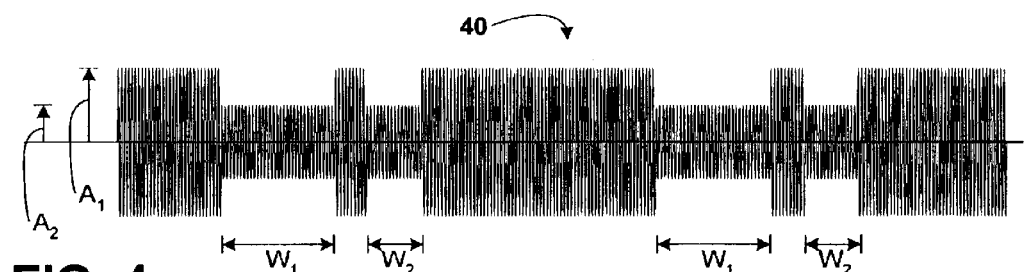
FIG. 4 illustrates the corresponding readout signal of a magnetic head as it passes relative to the medium along a centerline as depicted in FIG. 3.

FIG. 3 is another depiction of the servo band portion of medium 20. In addition, FIG. 3 illustrates a magnetic head 30 relative to medium 20 along centerline 35 of one of the servo tracks of medium 20. In other words, head 30 passes over medium 20, or alternatively medium 20 passes under head 30. FIG. 4 illustrates the corresponding readout signal 40 of magnetic head 30 as it passes relative to medium 20 along centerline 35 as depicted in FIG. 3.

When head 30 passes relative to region 27 that is completely recorded, readout signal 40 assumes its 100% maximum value $A_1$. However, when head 30 passes partially over one of servo windows 28A or 29A along centerline 35, signal 40 assumes value $A_2$, which is approximately 50% of the maximum value $A_1$. In other words, when head 30 is positioned precisely along centerline 35 at one of servo windows 28A or 29A, one-half of head 30 detects the signal in region 27 and the other half of head 30 passes over a non-recorded servo window 28A or 29A.

Readout signal 40 also provides a measure of widths $W_1$ and $W_2$, which correspond to the widths of servo windows 28 and 29, respectively. Because widths $W_1$ and $W_2$ are different from each other, a controller associated with head 30 can analyze readout signal 40 and determine whether an occurrence of amplitude $A_2$ corresponded to servo window 28A above centerline 35 or servo window 29A below centerline 35. Accordingly, the need for conventional synchronization markings in the servo pattern on medium 20 can be eliminated.

Figure 5:
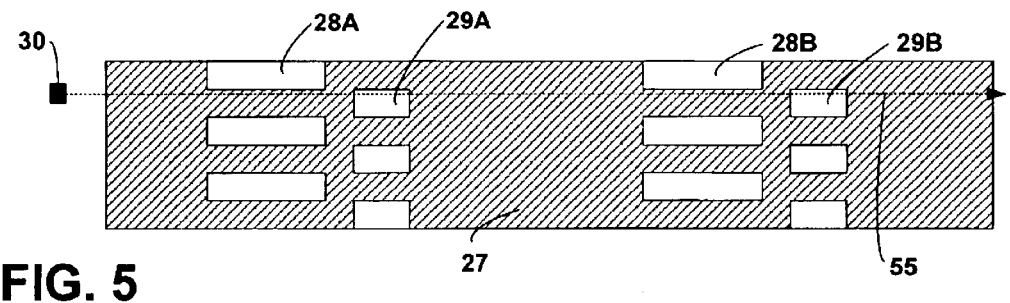
FIG. 5 is a depiction of the servo band portion of the medium illustrated in FIG. 2 with a magnetic head passing relative to the medium along a line slightly below the centerline of a servo track.
Figure 6:
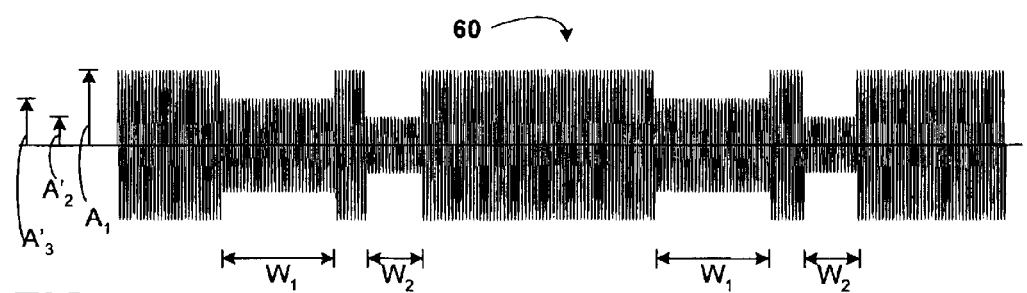
FIG. 6 illustrates the corresponding readout signal of a magnetic head as it passes relative to the medium as illustrated in FIG. 5.

FIG. 5 is another depiction of the servo band portion of medium 20. In addition, FIG. 5 illustrates a magnetic head 30 passing relative to medium 20 along a line 55, which is slightly below the centerline 25 of servo track 24A (FIG. 2) of medium 20. FIG. 6 illustrates the corresponding readout signal 60 of magnetic head 30 as it passes relative to medium 20 along line 55 as depicted in FIG. 5.

When head 30 passes relative to region 27 that is completely recorded, readout signal 60 assumes its 100% maximum value $A_1$. However, when head 30 passes partially over one of servo windows 28A or 29A along line 55, signal 60 assumes different values. In particular, when head 30 passes partially over one of servo window 28A along line 55, signal 60 assumes value $A'_3$, which is less than $A_1$, but larger than 50% of $A_1$. When head 30 passes partially over one of servo window 29A along line 55, signal 60 assumes value $A'_2$, which is less than 50% of $A_1$.

Readout signal 60 also provides a measure of widths $W_1$ and $W_2$, which correspond to the widths of servo windows 28 and 29, respectively. Because widths $W_1$ and $W_2$ are different from each other, a controller associated with head 30 can analyze readout signal 60 and determine that $A'_2$ is associated with a window below the centerline and $A'_3$ is associated with a window above the centerline. Thus, the controller can determine that head 30 is off-track and needs to be moved laterally upward. Again, synchronization marks are not needed because differing widths of windows 28 and 29 allow for self-synchronization.

Figure 7:
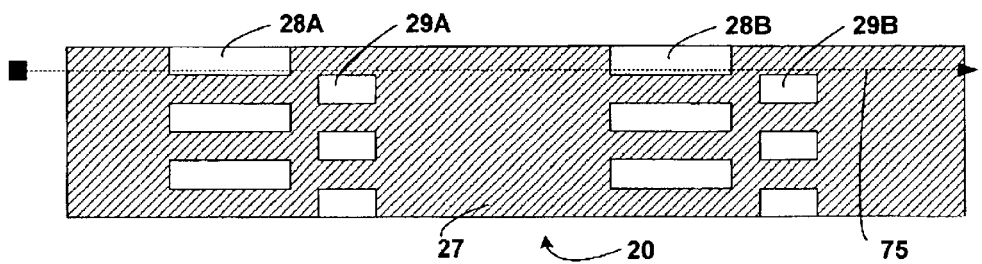
FIG. 7 is a depiction of the servo band portion of the medium illustrated in FIG. 2 with a magnetic head passing relative to the medium along a line slightly above the centerline of a servo track.
Figure 8:
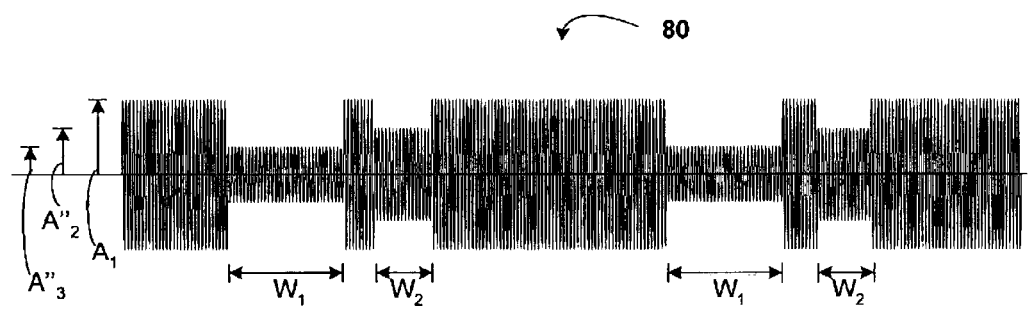
FIG. 8 illustrates the corresponding readout signal of a magnetic head as it passes relative to the medium as illustrated in FIG. 7.

FIG. 7 is another depiction of the servo band portion of medium 20. In addition, FIG. 7 illustrates a magnetic head 30 passing relative to medium 20 along a line 75, which is slightly above the centerline 25 of servo track 24A (FIG. 2) of medium 20. FIG. 8 illustrates the corresponding readout signal 80 of magnetic head 30 as it passes relative to medium 20 along line 75 as depicted in FIG. 7.

When head 30 passes relative to region 27 that is completely recorded, readout signal 80 assumes its 100% maximum value $A_1$. However, when head 30 passes partially over one of servo windows 28A or 29A along line 75, signal 80 assumes different values. In particular, when head 30 passes partially over one of servo window 28A along line 75, signal 60 assumes value $A''_3$, which is less than 50% of $A_1$. When head 30 passes partially over one of servo window 29A along line 55, signal 60 assumes value $A''_2$, which is less than $A_1$, but larger than 50% of $A_1$. Therefore, a controller of head 30 can determine whether to move head 30 up or down with respect to the centerline, in response to such off-track amplitude measurements based on the amplitude measurement and the corresponding width measurement associated with the amplitude. Such self-synchronization is highly desirable because it eliminates the need for additional synchronization markings, and manufacturing efforts associated with formation of additional synchronization markings.

Readout signal 80 also provides a measure of widths $W_1$ and $W_2$, which correspond to the widths of servo windows 28 and 29, respectively. Because widths $W_1$ and $W_2$ are different from each other, a controller associated with head 30 can analyze readout signal 80 and determine that $A''_2$ is associated with a window below the centerline and $A''_3$ is associated with a window above the centerline. Thus, the controller can determine that head 30 is off-track and needs to be moved laterally downward. Again, synchronization marks are not needed because differing widths of windows 28 and 29 allow for self-synchronization.

Figure 9:
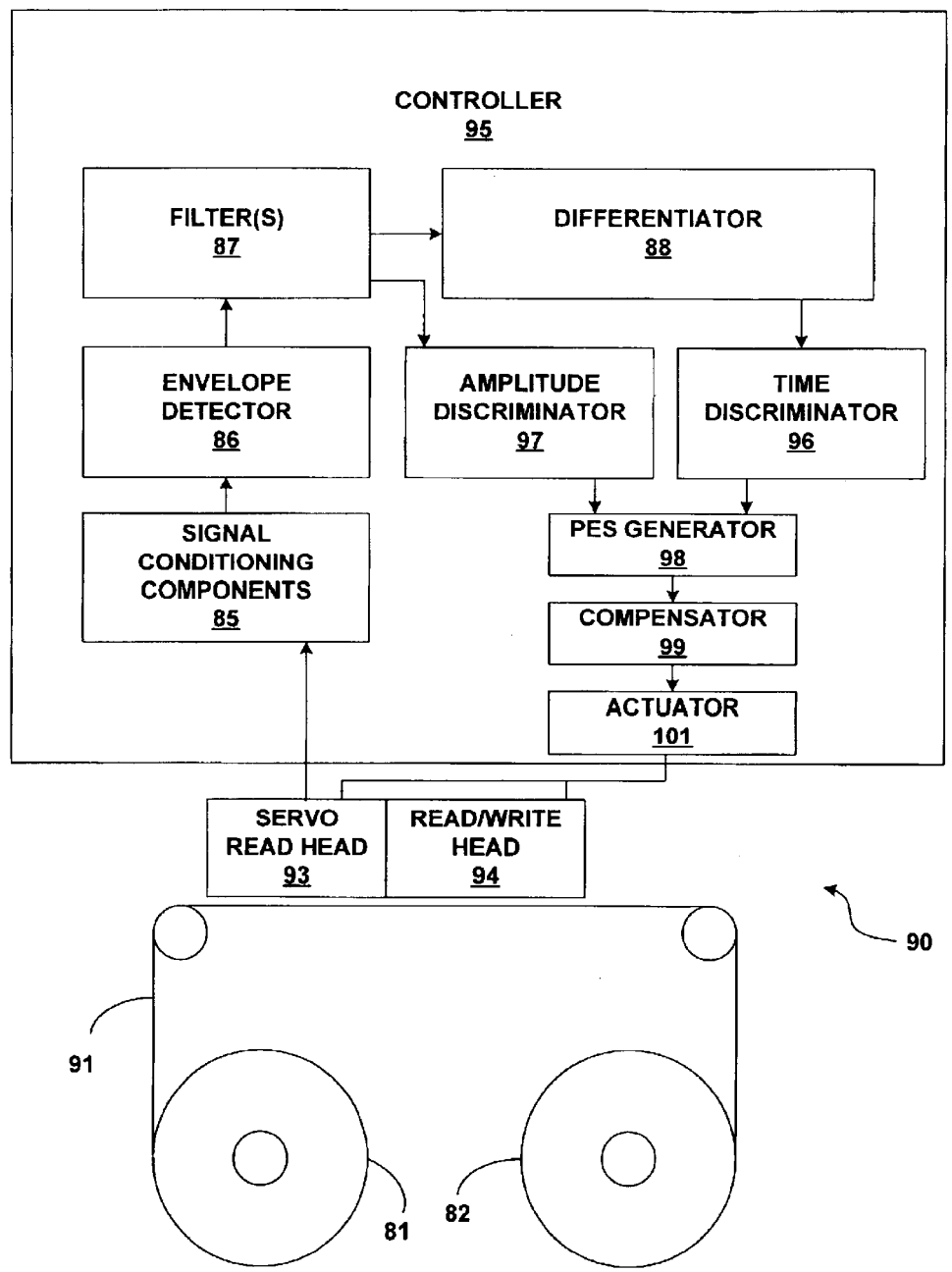
FIG. 9 is a block diagram of a servo system according to an embodiment of the invention.

FIG. 9 is a block diagram of a system 90 comprising a data storage medium 91 in the form of magnetic tape, a servo read head 93, a data read/write head 94, and a controller 95 to control the positioning of heads 93, 94 relative to medium 91. Medium 91 comprises magnetic tape spooled onto spools 81 and 82. In particular, medium 91 feeds from spool 81 to spool 82, passing in close proximity to servo head 93 and read/write head 94 for magnetic recording and/or readout. Medium 91 generally corresponds to medium 20 described above, and includes servo windows of different widths.

Servo head 93 detects servo signal amplitudes in medium 91 and provides the detected signal to controller 95. Signal conditioning components 85, such as amplifiers, preamplifiers, filters, or the like, condition the detected signal and provide the detected signal to envelope detector 86, which generates an envelope signal based on the detected and conditioned signal. The envelope signal is filtered by one or more filters 87, e.g., in order to round the corners of square waves in the envelope signal. Differentiator 88 generates pulses corresponding to the edges in the envelope signal. The pulses provide information regarding the measured amplitude of the signal and the distance between pulses provide information regarding the widths of the servo windows.

Amplitude discriminator 97 compares the amplitudes of the envelope signal to a threshold, such as 50% of the maximum amplitude, and time discriminator 96 measures the timing between pulses in order to estimate the widths of the servo windows. Position error signal (PES) generator 98 generates position error signals based on the measured amplitudes and widths, and provides the position error signals to compensator 99. For example, the position error signal can be generated by integrating the rectified waveform. Compensator 99 generates signals to adjust the lateral positioning of heads 93, 94 relative to medium 91 in order to achieve on-track positioning of heads 93, 94 relative to medium 91. Actuator 101 applies the signals of compensator 99 in order to control movement of heads 93, 94 relative to medium 91. In this manner, controller 95 uses servo patterns on medium 91, and provides feedback control of positioning of heads 93, 94 relative to medium 91 based on the detected servo patterns.

FIG. 10 illustrates a readout signal 100 that may be generated when servo head 93 passes relative to track 24A substantially along centerline 25 (FIG. 2). Based on signal 100, envelope detector 86 generates envelope signal 102. Then, following filtering by filter 87, differentiator 88 generates pulses 105A–105H (collectively pulses 105) as shown in FIG. 11, corresponding to the edges in envelope signal 102.

Amplitude discriminator 97 compares the amplitude of pulses 105 to a threshold, such as 50% of the maximum amplitude, and time discriminator 96 measures the timing ($T_1$ and $T_2$) between pulses in order to estimate the widths of servo windows 28, 29 (FIG. 2) on medium 91. Position error signal (PES) generator 98 generates position error signals based on the measured amplitudes and widths, and provides the position error signals to compensator 99. Compensator 99 uses the position error signals to generate adjustment signals for actuator 101, which adjusts lateral positioning of heads 93, 94 relative to medium 91 in order to achieve on-track positioning of heads 93, 94 relative to medium 91. In this case, actuator 101 does not adjust the lateral positioning of heads 93, 94 because signal 100, signal 102, and corresponding pulses 105 indicate that positioning is exactly on track (or at least within the minimum position error measurement tolerance of the system).

FIG. 12 illustrates a readout signal 120, that may be generated when servo head 93 passes relative to track 24A below centerline 25 (FIG. 2). Based on signal 120, envelope detector 86 generates envelope signal 122. Then, following filtering by filter 87, differentiator 88 generates pulses 125A–125H (collectively pulses 125) as shown in FIG. 13, corresponding to the edges in envelope signal 122.

Amplitude discriminator 97 compares the amplitude of pulses 125 to a threshold, such as 50% of the maximum amplitude, and time discriminator 96 measures the timing ($T_1$ and $T_2$) between pulses in order to estimate the widths of servo windows 28, 29 (FIG. 2) on medium 91. Position error signal (PES) generator 98 generates position error signals based on the measured amplitudes and widths, and provides the position error signals to compensator 99. Compensator 99 uses the position error signals to generate adjustment signals for actuator 101, which adjusts lateral positioning of heads 93, 94 relative to medium 91 in order to achieve on-track positioning of heads 93, 94 relative to medium 91.

In this case, actuator 101 causes heads 93, 94 to move upward because signal 120, signal 122, and corresponding pulses 125 indicate that positioning of heads 93, 94 is below centerline 25 (FIG. 2). Controller 95 is programmed to recognize, for every given servo track 24, which of the larger and smaller servo windows resides above or below the center line for that given track. For this reason, differently sized servo windows 28, 29 enable self synchronization without the need for additional synchronization markings in the servo pattern.

FIG. 14 illustrates a readout signal 140 that may be generated when servo head 93 passes relative to track 24A above centerline 25 (FIG. 2). Based on signal 140, envelope detector 86 generates envelope signal 142. Then, following filtering by filter 87, differentiator 88 generates pulses 145A–145H (collectively pulses 145) as shown in FIG. 15, corresponding to the edges in envelope signal 142.

Amplitude discriminator 97 compares the amplitude of pulses 145 to a threshold, such as 50% of the maximum amplitude, and time discriminator 96 measures the timing ($T_1$ and $T_2$) between pulses in order to estimate the widths of servo windows 28, 29 (FIG. 2) on medium 91. Position error signal (PES) generator 98 generates position error signals based on the measured amplitudes and widths, and provides the position error signals to compensator 99. Compensator 99 uses the position error signals to generate adjustment signals for actuator 101, which adjusts lateral positioning of heads 93, 94 relative to medium 91 in order to achieve on-track positioning of heads 93, 94 relative to medium 91. In this case, actuator 101 causes heads 93, 94 to move laterally downward because signal 140, signal 142, and corresponding pulses 145 indicate that positioning of heads 93, 94 is below centerline 25 (FIG. 2). Again, controller 95 is programmed to recognize for every given servo track 24, which of the larger and smaller servo windows resides above or below the center line for that given track, thereby allowing for self synchronization without the need for additional synchronization markings in the servo pattern.

Figure 16:
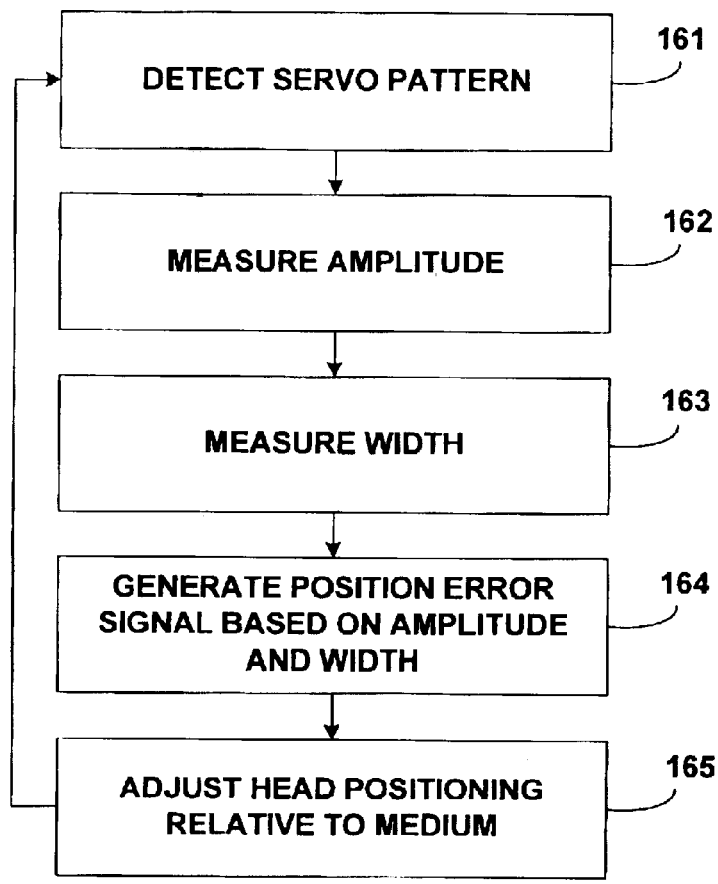
FIG. 16 is a flow diagram illustrating a servo technique according to an embodiment of the invention.

FIG. 16 is a flow diagram illustrating a servo technique according to an embodiment of the invention. As shown in FIG. 16, servo head 93 detects an amplitude-based servo pattern in medium 91 (161). Controller 95 measures the amplitude of the detected servo signal (162), and the width associated with the detected servo signal at a common amplitude (163). Controller 95 generates a position error signal based on the measured amplitude and width. For example, controller 95 can be programmed to recognize, for every given servo track 24, which of the larger and smaller servo windows resides above or below the center line for that given track. Thus, given the amplitude and the width, controller 95 can generate a position error signal indicative of the off-track positioning of heads 93, 94 (164). Controller 95 then applies the position error signal to adjust the positioning of heads 93, 94 in order to correct for such off-track positioning (165). The process of FIG. 16 can repeat itself as the tape moves past heads 93, 94.

Figure 17:
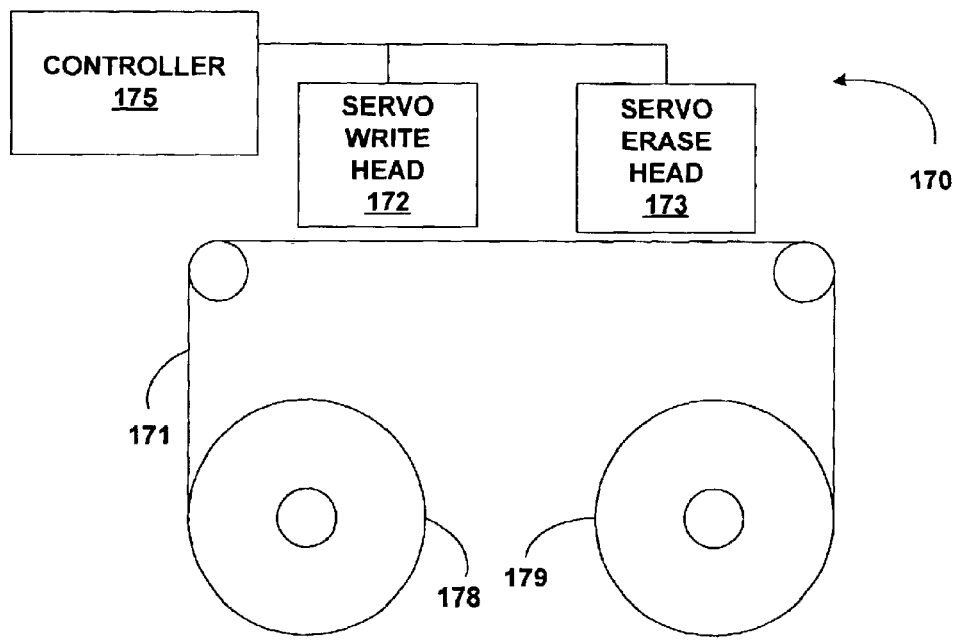
FIG. 17 illustrates an exemplary system for pre-recording servo patterns as described herein.

FIG. 17 illustrates an exemplary system 170 for pre-recording servo patterns as described herein. System 170 includes a data storage medium 171 in the form of magnetic tape, a servo write head 172, a servo erase head 173, and a controller 175 to control the magnetic fields applied by heads 172, 173. Medium 171 comprises magnetic tape spooled onto spools 178 and 179. In that case, medium 171 feeds from spool 178 to spool 179, passing in close proximity to heads 172, 173 for servo recording.

Controller 175 causes servo write head 172 to write a periodic pattern substantially over the full servo band associated with medium 171. Then controller 175 causes servo erase head 173 to selectively erase servo windows above and below centerlines of the various tracks within the servo band. In accordance with the invention, the erased servo windows above the centerlines are sized different from the erased servo windows below the centerlines, as outlined herein. In particular, the servo windows above the centerline can be made to have a substantially different width from those below the centerline, such that different widths of the different servo windows can be identified during readout of the servo pattern. The widths of the servo windows above the centerline may be substantially larger or substantially smaller than those below the centerline in a given servo track.

Figure 18:
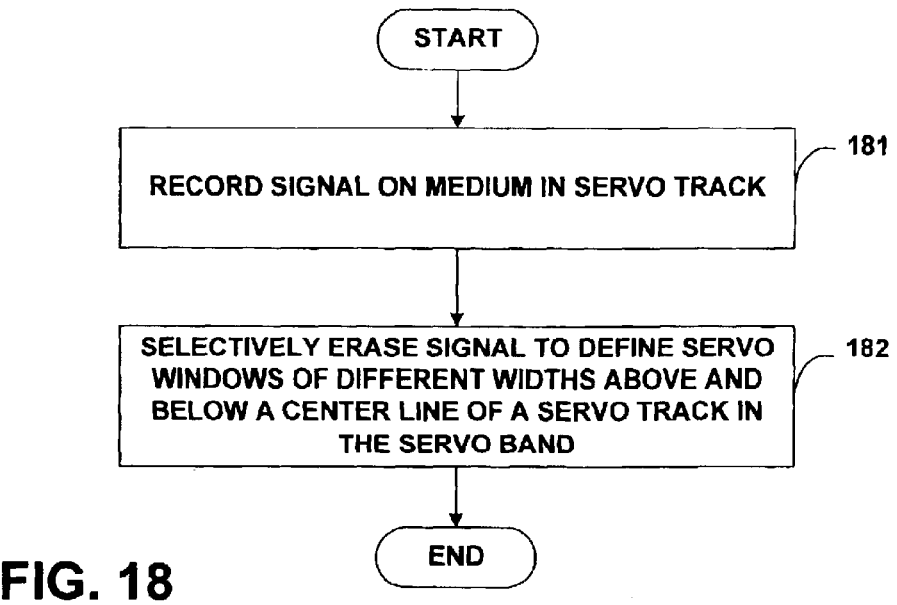
FIG. 18 is a flow diagram illustrating a technique for pre-recording servo patterns as described herein.

FIG. 18 is a flow diagram illustrating a technique for pre-recording servo patterns as described herein. As shown in FIG. 18, servo write head 172 records a magnetic signal on a medium in a servo band (181). Servo erase head 173 then selectively erases the signal to define servo windows of different widths above and below a centerline of a servo track within the servo band (182). In some cases, numerous servo erase heads can be used to create the different servo windows above and below the centerlines of various tracks in the servo band.

The invention can provide a number of advantages. In general, amplitude-based servo patterns can facilitate the ability to pinpoint locations on media surfaces with greater accuracy. Therefore, the described servo patterns can allow for smaller amounts of media surface to be used to store units of data. Moreover, servo patterns making use of different sized servo windows above and below a centerline can simplify the pattern relative to conventional amplitude-based patterns by eliminating the need for additional markings conventionally used for synchronization in the servo detection. Instead, widths of the different sized servo windows can be measured in order to provide self-synchronization without such additional synchronization markings. In addition, eliminating conventional synchronization markings can allow the servo windows to be placed closer together, resulting in higher servo-position error signal sample rates.

Moreover, eliminating conventional synchronization markings can simplify the process of recording the amplitude-based servo patterns on the medium, possibly improving media quality and/or reducing media manufacturing costs. For example, the recording of transition regions 18 (FIG. 1) can be a complicated process because transition regions 18 are typically recorded at a different frequency than region 17. In accordance with the invention, region 27 (FIG. 2) for the whole servo band 26 can be recorded at substantially the same frequency, which can simplify the recording process and may improve media quality. In that case, servo windows 28, 29 would be erased from medium 20 during fabrication.

A number of embodiments of the invention have been described. For example, servo patterns comprising amplitude-based servo windows of different widths positioned above and below a centerline of a servo track have been described. Such differently sized servo windows can eliminate the need for additional markings conventionally used for synchronization in the servo detection. Nevertheless, various modifications may be made without departing from the scope of the invention. For example, the servo windows could be written with signals, rather than erased, as outlined herein. In addition, the invention could be used with other media that makes use of pre-recorded servo patterns, such as magnetic disks, holographic media, or the like. Accordingly, other embodiments are within the scope of the following claims.

What is claimed is:

1. A data storage medium comprising:
   a servo track defining a centerline;
   a first amplitude-based servo window above the centerline; and
   a second amplitude-based servo window below the centerline, wherein a width of the first amplitude-based servo window is different from a width of the second amplitude-based servo window, wherein the data storage medium is magnetically recorded with a signal and the first and second amplitude-based servo windows comprise erase windows where the magnetically recorded signal has been erased from the data storage medium.

2. The data storage medium of claim 1, further comprising a plurality of servo tracks, each of the servo tracks respectively defining a centerline and including respective first and second amplitude-based servo windows of differing widths above and below a respective centerline associated with the respective servo track.

3. The data storage medium of claim 1, further comprising a plurality of servo frames along the servo track, wherein each of the servo frames includes respective first and second amplitude-based servo windows above and below the centerline.

4. The data storage medium of claim 3, wherein the medium does not include any synchronization marks between the servo frames.

5. A system comprising:
   a data storage medium including a servo track defining a centerline, a first amplitude-based servo window above the centerline, and a second amplitude-based servo window below the centerline, wherein a width of the first amplitude-based servo window is different from a width of the second amplitude-based servo window;
   a head to pass relative to the medium at a location relative to the servo track and detection signals; and
   a controller to determine whether the location is above or below the centerline based on amplitudes of the signals detected by the head and widths of a given signal at a common amplitude.

6. The system of claim 5, the data storage medium including a plurality of servo tracks, each servo track defining a respective centerline and each servo track including respective first and second amplitude-based servo windows of differing widths above and below the respective centerline of the respective servo track, wherein the head passes relative to the medium at a location proximate to one of the servo tracks.

7. The system of claim 5, wherein the data storage medium is magnetically recorded with a servo signal and the first and second amplitude-based servo windows comprise erase windows where the servo signal has been erased from the data storage medium, and wherein the head comprises a magnetic head.

8. The system of claim 5, the data storage medium including a plurality of servo frames along the servo track, wherein for each frame a set of first and second amplitude-based servo windows respectively reside above and below the centerline.

9. The system of claim 8, wherein the medium does not include any synchronization marks between the servo frames.

10. The system of claim 5, wherein the controller includes an envelope detector to envelope signals indicative of signals detected by the head.

11. The system of claim 10, wherein the controller includes a differentiator to generate pulses corresponding to transitions in the envelope signals.

12. The system of claim 11, wherein the controller includes an amplitude discriminator to compare amplitudes of the envelope signal to a threshold.

13. The system of claim 12, wherein the controller includes a time discriminator to identify whether given pulses correspond to edges of the first or second amplitude-based servo windows based on timing between the given pulses.

14. The system of claim 13, further comprising a position error signal generator to generate a position error signal based on output of the amplitude discriminator and time discriminator.

15. A method comprising:
   detecting amplitudes of a servo signal along a location relative to a servo track of a magnetic medium;
   detecting widths associated with the servo signal at common amplitudes; and
   generating position error signals based on the detected amplitudes and widths.

16. The method of claim 15, further comprising adjusting positioning of a head relative to the magnetic medium based on the position error signals.

17. A method comprising:

recording a magnetic signal over a magnetic medium; and selectively erasing the magnetic signal to define erased servo windows, the erased servo windows including a first erased servo window positioned above a centerline of a servo track of the magnetic medium and a second erased servo window below the centerline, wherein a width of the first erased servo window is different from a width of the second erased servo window.

18. The method of claim 17, wherein the width of the first erased servo window is larger than the width of the second erased servo window.

* * * * *